United States Patent [19]

DeVelasco et al.

[11] Patent Number: 5,037,606

[45] Date of Patent: Aug. 6, 1991

[54] NUCLEAR FUEL PARTICLES AND METHOD OF MAKING NUCLEAR FUEL COMPACTS THEREFROM

[75] Inventors: Rubin I. DeVelasco, Encinitas; Charles C. Adams, San Diego, both of Calif.

[73] Assignee: The United States of America as represented by the United States Department of Energy, San Diego, Calif.

[21] Appl. No.: 242,374

[22] Filed: Sep. 9, 1988

[51] Int. Cl.⁵ .................................................. G21C 3/00
[52] U.S. Cl. ...................................... 376/411; 427/249
[58] Field of Search ..................... 376/411, 416, 417; 427/6, 248.1, 249 X

[56] References Cited

U.S. PATENT DOCUMENTS

| | | | |
|---|---|---|---|
| 4,022,660 | 5/1977 | Jonnson | 376/411 |
| 4,194,027 | 3/1980 | Adams | 427/249 |
| 4,267,019 | 5/1981 | Kaae | 376/411 |

Primary Examiner—Donald P. Walsh
Attorney, Agent, or Firm—Fitch, Even, Tabin & Flannery

[57] ABSTRACT

Methods for making nuclear fuel compacts exhibiting low heavy metal contamination and fewer defective coatings following compact fabrication from a mixture of hardenable binder, such as petroleum pitch, and nuclear fuel particles having multiple layer fission-product-retentive coatings, with the dense outermost layer of the fission-product-retentive coating being surrounded by a protective overcoating, e.g., pyrocarbon having a density between about 1 and 1.3 g/cm³. Such particles can be pre-compacted in molds under relatively high pressures and then combined with a fluid binder which is ultimately carbonized to produce carbonaceous nuclear fuel compacts having relatively high fuel loadings.

11 Claims, No Drawings

NUCLEAR FUEL PARTICLES AND METHOD OF MAKING NUCLEAR FUEL COMPACTS THEREFROM This invention was made with Government support under Contract No. DE-AC03-84SF11962 awarded by the Department of Energy. The Government has certain rights in this invention.

The invention relates to nuclear fuel particles less than a few millimeters in size and to methods of making nuclear fuel compacts from such particles for use in nuclear reactors. More particularly, the invention relates to improved nuclear fuel particles having fission-product-retentive coatings which are able to withstand high pressures to which they may be subjected during the formation of dense, nuclear fuel compacts and to methods for producing compacts having few fractured particle coatings therein.

BACKGROUND OF THE INVENTION

Pyrolytic carbon coatings have been used to protect particles of nuclear reactor fuel, i.e., fissile and/or fertile materials, such as uranium, plutonium and thorium in the form of suitable compounds thereof. Coatings of aluminum oxide and other ceramic oxides have also been proposed. Examples of nuclear fuel particles employing pyrolytic carbon coatings include U.S. Pat. No. 3,325,363, issued June 13, 1967; U.S. Pat. No. 3,298,921, issued Jan. 17, 1968, and U.S. Pat. No. 3,361,638, issued Jan. 2, 1968. It is also known to incorporate one or more layers of refractory carbide materials, such as silicon carbide or zirconium carbide, to produce nuclear fuel particles having still better fission product retention characteristics, as disclosed in U.S. Pat. No. 3,649,472, issued Mar. 14, 1972. So long as these fission product retentive coatings remain intact, contamination exterior of the particles by the heavy metal fuel material and/or substantial spread of fission products exterior of the coatings is prevented.

Such nuclear fuel particles are usually bonded together in some fashion to create what is termed in the art as a nuclear fuel compact, which is produced using a suitable binder and appropriate pressures. It has been found that fracture and/or cracking of the fission product retentive coatings often occurs during the formation of nuclear fuel compacts wherein these nuclear fuel particles are combined under high pressure with a binder material to produce a relatively dense "green" compact that is later subjected to high temperatures to produce the final nuclear fuel compact suitable for use in a nuclear reactor. It is also known to produce nuclear fuel compacts or nuclear fuel elements for a Pebble-Bed reactor or the like by blending such coated nuclear fuel particles with a carbonaceous thermosetting resin in a powder form and compressing the coated particle-resin mixture under pressures in excess of 20,000 psig to form "green" compacts, and sometimes these particles have been pre-treated with the resin. Nuclear fuel particles which can better tolerate such manufacturing processes are constantly being sought after.

BRIEF SUMMARY OF THE INVENTION

The invention minimizes the occurrence of fracture and/or cracking in the fission-product-retentive coatings by protecting coated particles by the use of appropriate overcoatings to allow them to achieve high loadings to meet overall nuclear fuel compact specifications. The employment of overcoating material having a density not greater than about 60% of its theoretical maximum density has been found to provide adequate protection for the more fragile fission-product-retentive layers during the green compacting steps when such coated particles are subjected to relatively high pressures.

DETAILED DESCRIPTION OF THE PREFERRED EMBODIMENTS

Very generally, nuclear fuel particles are provided which have central cores of fissile or fertile material surrounded by multiple layers of materials designed to retain within the confines thereof substantially all of the fission products created during burnup of the fissile atoms to a reasonable level. Various layers of materials, such as pyrolytic carbon and silicon carbide, as are known in the art, or other comparable fission-product-retentive materials, can be employed which provide good structural and dimensional stability and fission-product retention even when exposed to high temperatures in high level irradiation for long periods such as will be encountered in the core of a nuclear power reactor. Other suitable fission-product-retentive materials can also be used as a part of the overall fission-product-retentive coating arrangement that surrounds the fissile or fertile cores while still obtaining the benefit the overcoating provides to avoid fracture and/or cracking.

Although the central cores of nuclear fuel material may have different shapes, they are normally spheroidal in shape, and generally the diameter of the spheroid will be not greater than about 1 millimeter (1,000 microns). Usually, nuclear fuel will be in the form of spheroids between about 100 microns and about 500 microns in diameter. Preferably, fissile fuel cores have a diameter not greater than about 550 microns, and preferably fertile fuel cores are not greater than about 650 microns in diameter. Such so-called fertile fuel cores may contain mixtures of both fissile and fertile materials, for example, mixtures of uranium and thorium compounds. Core materials in the form of oxides or carbides or mixtures thereof are generally used, although other suitable forms, such as the nitride or the silicide, which are stable at relatively high temperatures, could alternatively be employed. Preferably, the fissile fuel cores are formed of mixtures of uranium oxide and uranium carbide; however, uranium oxide could be employed. On the other hand, fertile fuel cores should contain a suitable, high-temperature, stable thorium material, such as thorium oxide or thorium carbide; and a mixture of thorium carbide and thorium oxide or a mixture of thorium oxide and uranium oxide might be employed.

Because nuclear fuel materials generally expand during high-temperature operation and create gaseous and metallic fission products during fissioning, it is well known to make provision to accommodate these effects in order to facilitate prolonged operation under exposure to nuclear flux. Because the density of the core material is usually dictated by other manufacturing process considerations and/or design criteria, cores are normally of relatively dense material and thus unable to accommodate the accumulation of such gaseous fission products within the core region itself. As a result, an initial layer of relatively low density material is provided near the surface of the core to accommodate expansion at a location interior of the outer coatings which constitute the pressure-tight shell and to also accommodate gaseous fission products. The layer which surrounds the core should also be chemically compatible with the core material, both in the environment in which it is deposited and within the nuclear reactor where levels of high neutron flux will be accommodated. Spongy, pyrolytic carbon, which is a soot-like amorphous carbon having a diffuse X-ray diffraction pattern, is well known in the art and commonly employed for this purpose. Such spongy pyrocarbon also attenuates fission recoils and prevents structural damage to the outer layers, and as such it is generally employed somewhere between 20 microns and about 130 microns in thickness, with a thickness of about 50 to 60 microns often being used.

The exterior layers which create the pressure-tight shell often combine layers of relatively dense isotropic pyrolytic carbon and one or more layers of silicon carbide or zirconium carbide of sufficient thickness to provide good retention of metallic fission products. In general, dense, isotropic, pyrolytic carbon has good dimensional stability and, as such, is often provided both immediately interior of and exterior of the silicon carbide layer. The interior layer may be about 40-50 microns thick.

Generally, a continuous layer of silicon or zirconium carbide between about 20 microns to 45 microns in thickness is employed to assure adequate containment of metallic fission products is achieved. Such silicon or zirconium carbide layers can be applied in any suitable manner to achieve satisfactory densities which are usually at least about 90% of the theoretical maximum density of the carbide material. Such layers can be advantageously deposited from a vaporous atmosphere in a fluidized bed coating apparatus or the like as, for example, that described in detail in U.S. Pat. No. 3,298,921. For example, silicon carbide can be directly deposited from a mixture of hydrogen and methyltrichlorosilane, which easily produces densities of about 99% of maximum theoretical density.

Dense isotropic carbon has both good impermeability to gas and good dimensional stability during neutron irradiation, and generally its isotrophy should measure not more than about 1.2 on the Bacon scale. Such dense isotropic pyrolytic carbon can be deposited at relatively low temperatures, e.g., 1250° to 1400° C. or at temperatures at between about 1800° to 2200° C. At higher temperatures, a gas mixture containing about 10% by volume methane can be used, whereas at lower temperatures mixtures of about 20-40% propane or butane can be used. In general, about 25-50 microns of dense isotropic pyrolytic carbon is employed exterior of the metal carbide layer, and it should have a density of at least about 80% of the theoretical maximum density, e.g., about 1.85 to 1.95 g/cm$^3$.

The foregoing describes various of the multiple layer fission-product-retentive coating arrangements that can be used to provide a pressure-tight shell about a nuclear fuel material core, although, as indicated hereinbefore, other suitable fission-product-retentive arrangements can be employed. It is contemplated that these fission-product-retentive nuclear fuel particles should retain substantially all of the fission products generated therewithin throughout a burnup of up to about 30% of the fissile and/or fertile atoms present in the core. Very generally, the exterior dimension of the coated nuclear fuel particle will usually not exceed the range of about 3 to 5 millimeters, even if a nuclear fuel core as large as about 1 millimeter were employed.

The protective overcoating is disposed exterior of the outermost layer of the fission-product-retentive shell and has a density of about 60% of its theoretical maximum density or less. As indicated above, normally the exterior surface of the fission-product-retentive arrangement, or a layer very close thereto, will have a density equal to at least about 80% of its theoretical maximum density, and it is this relatively brittle or fragile material to which the overcoating material affords mechanical protection during the ensuing fabrication process. The preferred overcoating material is pyrocarbon having a density not greater than about 1.4 grams per cm$^3$, and preferably the pyrocarbon is isotropic pyrocarbon having a density between about 0.8 and about 1.4 grams per cm$^3$. To afford adequate protection, it is believed that the thickness of the protective pyrocarbon should measure at least about 20 microns. Although there is no reasonable upper limit to the thickness of such a layer from the standpoint of affording protection, the necessity to provide adequate nuclear fuel loading within certain spatial parameters places constraints upon the maximum thickness of the overcoating as it does on the maximum thickness of the pressure-tight shell. For this reason, it is felt that a protective overcoating between about 20 and about 70 microns in thickness will be used, and preferably between about 30 and 60 microns of pyrocarbon is employed. More preferably, a pyrocarbon overcoating is used having a thickness of at least about 30 microns and a density between about 1.0 and about 1.3 grams per cm$^3$. Although pyrocarbon is the preferred protective overcoating material, other chemically compatible substances having suitable nuclear properties might alternatively be employed. For example, aluminum oxide might be employed as a protective overcoating and when used as such might have a density between about 1.5 and about 2.0 grams per cubic centimeter.

Of course, the exterior diameter of the coated nuclear fuel particle which includes the protective overcoating will vary depending upon the size of the core and the size of the pressure-tight shell surrounding the core. Preferably, however, the outer diameter of fertile nuclear fuel particles does not exceed about 1300 microns, and the outer diameter of particles having fissile fuel cores does not exceed about 1200 microns.

To form the fuel compacts usable in a nuclear reactor, the coated fuel particles having these protective overcoatings are combined in precise amount with a flowable hardenable binder under pressure in a mold of the desired size and shape. Following the hardening of the binder, a nuclear fuel compact of the desired fuel loading is achieved. To achieve the desired fuel density within this compact, the particles and binder are subjected to relatively high pressure, and pressures of at least about 600 psig are commonly employed. Moreover, after the coated particles have been supplied to the mold and before the binder is supplied, the overcoated nuclear fuel particles are often subjected to precompacting pressures. For example, pressures between about 100 psig and about 600 psig may be employed. Suitable methods for forming nuclear fuel compacts from coated particles are disclosed in U.S. Pat. No. 4,024,209, the disclosure of which is incorporated herein by reference.

Various binders can be used, including binders that are flowable as a result of being in a molten condition and which are hardened by cooling. More commonly, binders of pitch, such as petroleum pitch or coal tar pitch, particularly in mixture with a graphite powder or flour, are used. Suitable compositions of this type, including pitch and certain alcohol and fatty acid additives, are disclosed in U.S. Pat. No. 4,217,174, issued Aug. 12, 1980, the disclosure of which is incorporated herein by reference. Alternatively, other types of resins, such as phenolic resins or furfural resins, which can be carbonized may also be used. The preferred mixtures of petroleum pitch and graphite flour, which is relatively fine particle size graphite of less than about 40 microns, are hardened by heating to a temperature of at least about 1000° C. Generally, so as not to unduly delay fabrication time and so as to assure that complete carbonization is achieved, temperatures of as high as about 2100° C. may be employed.

Following cooling to room temperature, the compacts are examined using tests to determine the extent of heavy metal (fissile or fertile) material which is leached from the compacts and to determine which particles suffered fracture damage such as to indicate a substantial loss of the fission-product-retention capability. The amount of contamination detectable from compacts made using features of the invention is a small fraction of that detected following the formation of comparable nuclear fuel compacts from coated nuclear fuel particles which are the same in all respects except for the absence of the protective overcoatings. Such tests show the effectiveness of the overcoatings in protecting the integrity of the pressure-tight shells during the compacting of the green material. Moreover, testing of these compacts following substantial neutron irradiation to a significant burnup of the nuclear fuel also shows equally significant improvement in fission-product retention over compacts made from particles without such protective overcoatings and confirms the test results are obtained by burning one of the compacts in order to ascertain the continued integrity of SiC layers.

The following example illustrates a preferred method for making nuclear fuel particles, and nuclear fuel compacts utilizing such particles, of the types generally herein described. However, this example should be understood to in no way limit the scope of the invention which is defined by the appended claims.

EXAMPLE

Spheroids of uranium oxide and uranium carbide are prepared having a major portion of uranium oxide material. Stoichiometrically, the spheroids can be viewed as having the composition $UC_{0.3}O_{1.7}$. The particle size of the spheroids is about 350 microns, and the spheroids are considered as being substantially fully dense.

The spheroids are heated in a suitable coating apparatus in a fluidized bed to a temperature about 1100° C. using a levitating flow of argon. A buffer coating of spongy pyrocarbon is deposited from acetylene gas at a partial pressure of about 0.5 (total pressure of 1 atmosphere). The acetylene decomposes and deposits low density spongy carbon upon the cores, and flow is continued for sufficient time to deposit a layer about 40 to 50 microns thick having a density about 1.1 gram per cc.

The flow of acetylene is then terminated, and the temperature is raised to about 1200° C. A partial pressure of propylene of about 0.07 is injected into the stream, and coating is carried out for about 5 minutes. This produces a thin, anisotropic coating of generally laminar carbon having a density of about 1.9 grams per $cm^3$.

The buffer-coated cores are then heated to about 1400° C., and a mixture containing about 10% propylene, about 10% acetylene, about 40% hydrogen and about 40% argon, all percents are by volume, is employed to deposit a layer of isotropic pyrocarbon about 50 microns thick having a density of about 1.95 g/$cm^3$ and a BAF of about 1.1.

The temperature is then raised to about 1500° C., and hydrogen is used as the fluidizing gas with about 10% by volume of the hydrogen stream being bubbled through a bath of methyltrichlorosilane. After about 1 hour at these conditions, a layer of silicon carbide about 20 microns thick has been uniformly deposited upon the carbon-coated spheroids. Subsequent measurement and examination shows that the silicon carbide is beta-phase SiC having a density of about 3.18 g/$cm^3$, which is about 99% of theoretical density of silicon carbide.

The silicon carbide-coated cores are maintained in this fluidized condition substituting a mixture of equal parts of argon and hydrogen as the fluidizing gas, and the temperature is lowered to about 1400° C. At this temperature, a mixture of 20% of equal parts of propylene and acetylene is injected to again deposit isotropic pyrocarbon having a density of about 1.95 g/$cm^3$ and a BAF of about 1.1.

The temperature of the fluidized particles is then lowered to about 1200° C., and a partial pressure of acetylene of about 0.4 atm. (total pressure 1 atm.) is injected for about 5 minutes. At the end of this time, the particles are cooled to near room temperature in the fluidizing gas stream and then removed and examined. The exterior coating of pyrocarbon shows a density of about 1.1 g/$cm^3$ and a thickness of between about 30 and 45 microns, with the mean thickness being about 40 microns for the overcoated material.

These overcoated particles are employed to fabricate fuel compacts of generally cylindrical shape having a diameter of about 0.5 inch and a height of about 1.96 inches. A charge of approximately 10 grams of these particles is metered into a mold which is being vibrated to assure adequate filling. A metering system such as that shown in U.S. Pat. No. 4,111,335 to Arya, et al. is used; the completed compacts have a fissile core total volume of about 2.24 $cm^3$ in a compact of about 6 $cm^3$. Pre-compaction pressure at about 200 psig is employed to initially reduce the size of the mold to essentially that of the desired height of the fuel compact. After pre-compaction is complete, a mixture of petroleum pitch and graphite flour is injected, which mixture contains about 40 weight per cent graphite flour (having a maximum particle size of about 40 microns), based upon total weight of the mixture. Injection into the mold is via a passageway arrangement that extends around one of the end pistons. Injection takes place at a pressure of about 1000 psig, and the temperature of the pitch mixture and the mold are maintained at about 150° C. Once injection is complete, the temperature of the mold is cooled to solidify the binder, and the compacts are ejected from the mold at a temperature of about 30° C. They are then transferred to a circulating nitrogen furnace where they are heated for about 5–10 minutes at a temperature of about 1000° C. in order to carbonize the binder material.

The individual coated nuclear fuel particles made in Example I are tested along with particles removed from the coater prior to the application of the final protective overcoating. The earlier-removed particles exhibit a crush strength of about 6 pounds, whereas the particles after application of the protective overcoatings show a crush strength nearly double that value. The completed fuel compacts are then examined for heavy metal contamination which is indicative of substantial fracture of the fission-product-retentive shells during the compact fabrication process. These compacts are tested by what is termed the HCl leach method wherein exposure to gaseous HCl leaches heavy metal, i.e., uranium, from the compacts. The carbonized fuel compacts are loaded into graphite crucibles in a furnace that is then heated to a temperature of about 1400° C. wherein hydrogen chloride gas is circulated for about 8 hours. The gaseous chlorides of uranium (and/or thorium if present) are formed, and by monitoring the amounts of uranium chlorides, the heavy metal contamination can be calculated. The compacts show less than $1 \times 10^{-5}$ grams of uranium per total grams of uranium in the compact, thus showing that the desired level of quality is obtained. Compacts made using such coated nuclear fuel particles without the protective overcoatings are similarly examined for heavy metal contamination and are found to exhibit contamination of about $3 \times 10^{-5}$ grams of uranium per total number of grams of uranium, thus putting into perspective the reduction which is achieved by the use of the protective overcoatings.

The HCl leach step also effects a cleaning of heavy metal contamination from such compacts before they are treated in the final heat treatment furnace. Heating in this furnace for a temperature of about 1700° C. for about one-half hour results in decomposition of any remaining hydrocarbons in the binder and a slight degree of binder graphitization. Following a final inspection for correct dimensions and visual appearance, the fuel compacts are ready for loading into nuclear fuel blocks to form fuel elements. Further testing by burning of one of each of the groups of compacts shows that the protection afforded by the overcoating during the fabrication process results in a decrease in the defective fraction of fission-product-retentive coatings to a level of about 60% of those found in compacts without the protective overcoatings.

Although the invention has been described with regard to the best mode presently understood by the inventors, changes and modifications as would be obvious to one having the ordinary skill in this art may be made without departing from the scope of the invention which is to be found in the claims appended hereto. Particular features of the invention are emphasized in the claims that follow.

What is claimed is:

1. A nuclear fuel particle comprising
   a core of generally spheroidal shape containing fissile or fertile nuclear fuel material and having a diameter not greater than about 1,000 microns,
   a buffer layer of low density pyrocarbon in surrounding location to said core,
   fission-product-retentive means surrounding said buffer layer designed to retain fission products therewithin and having an exterior surface formed of a material having a density equal to at least about 80% of theoretical density, and
   a protective overcoating disposed exterior of said fission-product-retentive means and in surrounding relation thereto and having a density not greater than about sixty percent of its theoretical maximum density, said diameter of the nuclear fuel particle including said protective overcoating being not greater than about 5 millimeters, whereby said protective overcoating mechanically protects said relatively fragile fission-product-retentive means from stress encountered during fabricating solid nuclear fuel compacts from said overcoated particles by the uniting of such overcoated particles into integral masses using a hardenable flowable binder.

2. A nuclear fuel particle according to claim 1 wherein said protective overcoating is made of isotropic pyrocarbon having a density between about 1.0 and about 1.3 g/cm$^3$.

3. A nuclear fuel particle in accordance with claim 1 wherein said spheroidal core contains uranium oxide, uranium carbide or a mixture thereof and has a diameter not greater than about 550 microns and wherein the outer diameter of said protective overcoating is not greater than about 1200 microns.

4. A nuclear fuel particle in accordance with claim 2 wherein the thickness of said overcoating is between about 20 microns and about 70 microns.

5. A nuclear fuel particle comprising a core of generally spheroidal shape containing fissile or fertile nuclear fuel material, a buffer layer of low density pyrocarbon in surrounding location to said core, fission-product-retentive means surrounding said buffer layer designed to retain fission products therewithin, and a protective overcoating of relatively porous aluminum oxide disposed exterior of said fission-product-retentive means and in surrounding relation thereto and having a density not greater than about sixty percent of its theoretical maximum density whereby said protective overcoating mechanically protects said relatively fragile fission-product-retentive means from stress encountered during fabricating solid nuclear fuel compacts from said overcoated particles by the uniting of such overcoated particles into integral masses using a hardenable flowable binder.

6. A nuclear fuel particle in accordance with claim 5 wherein said aluminum oxide has a density between about 1.5 and about 2.0 g/cm$^3$.

7. A nuclear fuel particle in accordance with claim 1 wherein said spheroidal core contains thorium oxide, or thorium carbide, or a mixture of thorium carbide and thorium oxide, or a mixture of thorium oxide and uranium oxide and has a diameter not greater than 650 microns and wherein the outer diameter of said overcoating is not greater than about 1300 microns.

8. A method of making nuclear fuel compacts, which method comprises
   forming fission-product-retentive nuclear fuel particles by coating spheroidal cores of fissile or fertile nuclear fuel material with a plurality of surrounding layers which constitute fission-product-retention means that will retain substantially all fission products generated therewithin throughout burnup up to about 30 percent of the fissile atoms present in said cores, a region at the outer surface of said fission-product-retention means having a density of at least about 80% of its theoretical maximum density,
   overcoating said fission-product-retention means with a layer of relatively porous material by depositing onto said dense outer surface at least about 20 microns of a protective material having a density of not greater than about 60% of its maximum theoretical density,
   combining precise amounts of said overcoated nuclear fuel particles and a flowable, hardenable binder under pressure in a mold of desired shape, said overcoated nuclear fuel particles being loaded into said mold and then subjected to pressure to pre-compact them prior to said binder being injected into the interstices of said pre-compacted overcoated nuclear fuel particles under pressure, and hardening said binder which is a mixture of petroleum pitch and graphite flour by heating said combination of overcoated particles and binder to a temperature of at least about 1000° C. to create a nuclear fuel compact of desired fuel loading wherein substantially all of said fission-product-retention means remain intact and unfractured.

9. A method in accordance with claim 8 wherein said heating is carried out at a temperature of about 2100° C. or below.

10. A method in accordance with claim 8 wherein said pre-compacting is carried out at a pressure of between about 100 psig and about 600 psig.

11. A method in accordance with claim 8 wherein said flowable binder is injected under a pressure of at least about 600 psig.

* * * * *